United States Patent
Andar et al.

(10) Patent No.: US 11,403,340 B2
(45) Date of Patent: Aug. 2, 2022

(54) HIERARCHICAL MULTI-TIER LANGUAGE PROCESSING PLATFORM

(71) Applicant: Bank of America Corporation, Charlotte, NC (US)

(72) Inventors: Ravisha Andar, Plano, TX (US); Emad Noorizadeh, Plano, TX (US); Priyank R. Shah, Plano, TX (US); Prejish Thomas, Plano, TX (US); Saahithi Chillara, Allen, TX (US); Ramakrishna R. Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 166 days.

(21) Appl. No.: 16/996,091

(22) Filed: Aug. 18, 2020

(65) Prior Publication Data
US 2022/0058219 A1    Feb. 24, 2022

(51) Int. Cl.
*G06F 16/632* (2019.01)
*G06F 16/901* (2019.01)
*G10L 15/08* (2006.01)
*G06F 16/638* (2019.01)
*G10L 15/32* (2013.01)

(52) U.S. Cl.
CPC .......... *G06F 16/634* (2019.01); *G06F 16/638* (2019.01); *G06F 16/9027* (2019.01); *G10L 15/08* (2013.01); *G10L 15/32* (2013.01); *G10L 2015/088* (2013.01)

(58) Field of Classification Search
CPC .... G06F 16/632; G06F 16/634; G06F 16/638; G06F 16/9027; G06F 16/243; G10L 15/08; G10L 15/32; G10L 2015/088
See application file for complete search history.

(56) References Cited

U.S. PATENT DOCUMENTS

| | | | |
|---|---|---|---|
| 10,963,492 B2* | 3/2021 | Bhattacharya | G06F 16/288 |
| 11,238,111 B2* | 2/2022 | Chen | G06F 16/951 |
| 2010/0114886 A1* | 5/2010 | Cain, Jr. | G06F 16/36 707/E17.014 |
| 2013/0019018 A1* | 1/2013 | Rice | H04L 12/66 709/226 |
| 2018/0150524 A1* | 5/2018 | Anger | G06F 16/9535 |
| 2018/0173714 A1* | 6/2018 | Moussa | G06F 40/35 |
| 2018/0332167 A1* | 11/2018 | Lu | G06F 40/40 |
| 2019/0179878 A1* | 6/2019 | Collins | G06N 5/02 |
| 2021/0081848 A1* | 3/2021 | Polled | G06K 9/6259 |

* cited by examiner

*Primary Examiner* — Abdelali Serrou
(74) *Attorney, Agent, or Firm* — Weiss & Arons LLP

(57) ABSTRACT

Aspects of the disclosure relate to systems and methods for increasing the speed, accuracy, and efficiency of language processing systems. A provided method may include storing a plurality of modules in a database. The method may include configuring the plurality of modules in a multi-tier tree architecture. The method may include receiving an utterance. The method may include processing the utterance via a natural language processing (NLP) engine. The method may include routing the utterance. The routing may include identifying a highest tier module that matches a predetermined portion of the utterance. The method may include compiling a result set of modules. The method may include transmitting the result set of modules to the system user. The result set of modules may include a comprehensive and narrowly tailored response to the user request.

16 Claims, 5 Drawing Sheets

HIERARCHICAL MULTI-TIER LANGUAGE PROCESSING PLATFORM

FIELD OF TECHNOLOGY

Aspects of the disclosure relate to computer systems. Specifically, aspects of the disclosure relate to computerized language processing systems.

BACKGROUND OF THE DISCLOSURE

Language processing systems are useful for processing spoken utterances and resolving the intent of the speaker of the utterance. Once resolved, a computer system may be able to respond appropriately to a request of the speaker when a request is included or implicated in the intent of the speaker.

Conventional language processing systems, however, often suffer from speed, accuracy, and efficiency deficiencies. It may be difficult for the conventional systems to quickly disambiguate the utterance. This difficulty may cause the system to produce slow and/or inaccurate results. For example, if the word "apple" is a part of the utterance, the system may not be able to quickly determine if the intent is for the fruit or a company of the same name. Conventional systems may make an incorrect assumption. Conventional systems may take processing time to achieve an accurate result. Conventional systems may engage in time-consuming queries to the speaker to disambiguate the utterance and achieve an accurate result.

It would be desirable, therefore, to provide systems and methods for increasing the speed, accuracy, and efficiency of language processing systems.

SUMMARY OF THE DISCLOSURE

Aspects of the disclosure relate to a hierarchical multi-tier digital platform with increased processing speed, accuracy, and efficiency for routing a verbal request. The platform may include a processor. The platform may include a non-transitory memory storing a set of computer-executable instructions, that, when run on the processor, are configured to perform some or all platform functionality.

The platform may include a database including a plurality of modules. Each module may include a set of information. The plurality of modules may be configured in a multi-tier tree architecture. The multi-tier tree architecture may include at least three tiers. The first tier may include a first module that is a root node. Each tier aside from the first tier may include one or more modules that are each a child of a parent module that is one tier up in the tree (i.e., closer to the first tier). The set of information of a child module may be a subset of the set of information of the parent module of said child module.

The platform may be configured to receive an utterance. An utterance may include a string of one or more words spoken by a system user. The string of words may include a user request. The platform may be configured to process the utterance via a natural language processing (NLP) engine.

The platform may be configured to route the utterance. Routing the utterance may include identifying a highest tier module that matches a predetermined portion of the utterance. When at least one descendent module of the highest tier module exists, the platform may be configured to compile one or more of the descendent modules into a result set of modules. When descendent modules of the highest tier module do not exist, the platform may be configured to compile the highest tier module into the result set of modules. The platform may also be configured to transmit the result set of modules to the system user. The result set of modules may include a comprehensive and narrowly tailored response to the user request.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
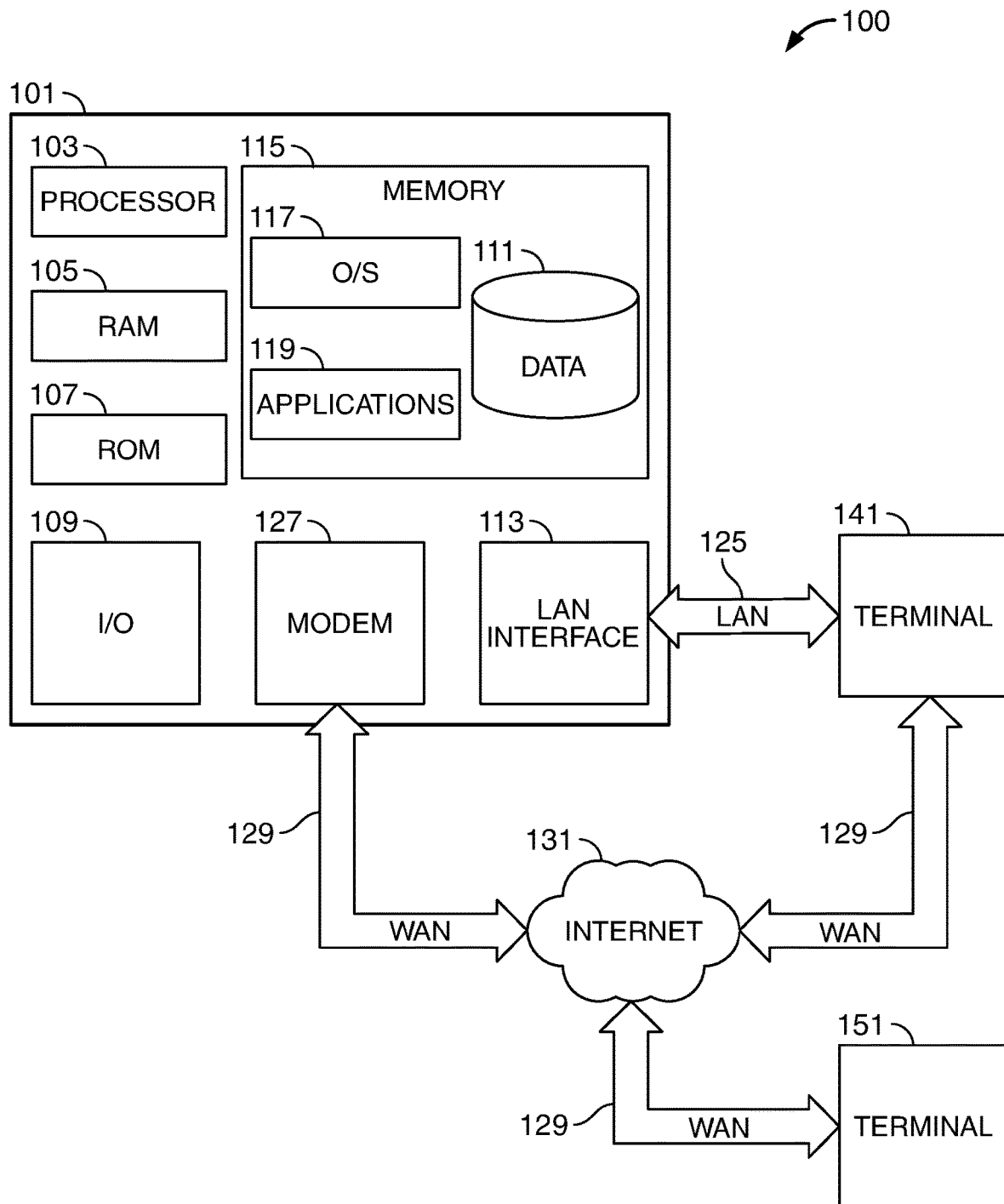
FIG. 1 shows an illustrative system in accordance with principles of the disclosure.

Aspects of the disclosure relate to systems and methods for increasing the speed, accuracy, and efficiency of language processing systems.

A hierarchical multi-tier digital platform is provided. The platform may be for routing a verbal or textual request. The platform may provide increased processing speed, accuracy, and efficiency. The platform may include a processor. The platform may include a non-transitory memory storing a set of computer-executable instructions, that, when run on the processor, are configured to perform some or all platform functionality.

The platform may include a database. The database may include a plurality of modules. Each module may include a set of information. Each module may correspond to an account or a category of accounts.

For example, in the context of an illustrative language processing system related to financial services, the plurality of modules may each represent a financial services account or a category of accounts. The set of information may include general account information. The set of information may also include user-specific information relating to the account, such as whether a system user is subscribed to the account (or an account within the account category), and/or account balance, constitution, or any other suitable account information. The set of information may include rules, such as regular expression ("regex") patterns, for use in resolving utterances related to the account or category of accounts.

The plurality of modules may be configured in a multi-tier tree architecture. The multi-tier tree architecture may include two tiers. The multi-tier tree architecture may, in certain preferred embodiments, include at least three tiers. The first tier may include a first module that is a root node. Each tier aside from the first tier may include one or more modules that are each a child of a parent module that is one tier up in the tree (i.e., closer to the first tier). The set of information of a child module may be a subset of the set of information of the parent module of said child module.

For example, in the illustrative case of a financial services system, the root node may represent a category that includes all financial services offered by the system. The second tier may include subcategories such as a transactional account category and an investment account category. The third tier may include subcategories of the second-tier categories. For example, the third tier may include a subcategory module representing retirement funds, which may in turn have descendant fourth tier modules representing specific retirement funds offered by the system. The third tier may also include modules that represent actual investment accounts, such as a certificate of deposit (CD) account. The tree structure may also include many other modules, some of which may represent categories—which in turn may have descendant modules that represent categories and/or accounts—and some of which may represent actual accounts.

The platform may be configured to receive an utterance. An utterance may include a string of one or more words spoken by a system user. In some embodiments, the utterance may be a string of words typed, written, or otherwise generated by the user. The string of words may include a user request. The request may, for example, relate to an account represented by one or more of the modules.

The platform may be configured to process the utterance via a natural language processing (NLP) engine. In some embodiments, processing the utterance may include tokenizing and/or annotating the utterance via the NLP engine. Tokenizing and/or annotating the utterance may include breaking the utterance into words or phrases, and labeling the words/phrases with metadata such as parts-of-speech labels.

The platform may be configured to route the utterance. Routing the utterance may include identifying a highest (i.e., closest to the first tier) tier module that matches a predetermined portion of the utterance. The predetermined portion may include the whole utterance. The predetermined portion may include a keyword. The predetermined portion may include all significant words in the utterance. The predetermined portion may include any suitable portion that, when used to identify a match, facilitates a meaningful match representing substantially equivalent intents.

When at least one descendent (i.e., a child, grandchild, etc.) module of the highest tier module exists, the platform may be configured to compile one or more of the descendent modules into a result set of modules. When descendent modules of the highest tier module do not exist, the platform may be configured to compile the highest tier module alone into the result set of modules. The platform may also be configured to transmit the result set of modules to the system user. The result set of modules may include a comprehensive and narrowly tailored response to the user request.

In some embodiments, the result set of modules may include only the descendent modules that are a maximum of one tier below said highest tier module.

In certain embodiments, when the result set of modules includes at least one module that is a parent module to at least two child modules, systems and methods may be further configured to transmit to the system user a request to select one or more modules from the at least two child modules, and, based on the selection, remove from the result set any unselected modules of the at least two child modules.

In some embodiments, the result set of modules may include only modules that are leaf nodes. A leaf node may be a module that is not a parent module of any child modules.

In some embodiments, the system user may be subscribed to one or more of the plurality of modules. The result set of modules may be filtered to include only subscribed modules. Subscribed modules may include modules to which the system user is subscribed or to which the system user is subscribed to at least one descendent.

In one illustrative scenario, the utterance may be "what is my account balance." The highest tier that matches this utterance may be the first tier, including all financial services. The result set may include all the modules of the second tier. In a scenario where the second-tier modules include at least two modules which have descendent modules in the third tier, the system may prompt the user to select one or more of those modules. In another embodiment, the platform may not include any modules that are categories, and may only include modules which are actual accounts, and these may be represented by modules of any tier. Furthermore, some embodiments may only include in the result set those accounts to which the user is subscribed.

In another illustrative scenario, the utterance may be "show me my retirement account balance." The highest tier module matching the utterance may be a retirement account category which may be represented by a module in the third tier. The retirement account module of the third tier may, for example, have three child modules in the fourth tier, a Roth account module, a 401k module, and an Individual Retirement Arrangements (IRA) module. The Roth account module may represent a category, and may, for example, be associated with two child modules in the fifth tier, a first and second Roth account. The 401k module and the IRA module may be leaf nodes that represent actual accounts.

In this scenario, the result set may include the three child modules, and may prompt the user for a selection. In some embodiments, the result set may include the first and second Roth accounts and also the 401k account and the IRA account. In some embodiments, the platform may automatically exclude any account to which the user is not subscribed. For example, if the user has a second Roth account and a 401k, the result set that is transmitted to the user may include only the second Roth account and the 401k.

In certain embodiments, each module may include an investment account or a category of investment accounts. The set of information of a module may include investment account information.

In some embodiments, the database may further include at least one rule set. A rule set may include a set of regular expression ("regex") patterns. Systems and methods may be further configured to resolve an intent of the utterance by comparing the utterance to the rule set to find a match between the utterance and one of the regular expression patterns.

In certain embodiments, the database may include a distinct rule set for each module. Each distinct rule set may be tailored based on requests typically received for the accounts and categories represented by each module, thereby enabling quick and efficient resolution of the intents of received utterances.

In some embodiments, one of the rule sets may include a rule for identifying stock names. The rule for identifying stock names may include identifying a word from the utterance that is identified by the system as a noun as a stock name. A word that is identified by the system as a noun may include a word that is a part of speech other than a noun but is used in a portion of the utterance that is associated with being a noun.

In certain embodiments, the set of regular expression patterns of one of the rule sets may include one, some, or all of the regex patterns below. These illustrative regex patterns may match requests that may typically be received within a certain module, such as an investment request module.

```
([/range|quote|close|open/] [/for|of/]?) (?$StockName[{tag:/NN.*|FW/}]{1,4});
([/reports|price/] [/range/]? [/for|of/]?) (?$StockName[{tag:/NN.*|FW/}]{1,4});
([/sector/] [/for|to/]?) (?$StockName[{tag:/NN.*|FW/}]{1,4});
([/52-week/] [/range/] [/for|of/]?) (?$StockName[{tag:/NN.*|FW/}]{1,4});
([/analysts/]) (?$StockName[{tag:/NN.*|FW|VBP/}]{1,4});
([/nav/]) (?$StockName[{tag:/NN.*|FW|VBP/}]{1,4});
([/peers|volume|esg|analysts|articles|beta|coverage|dividend|earnings|eps|nav|news|fundamen
tals|chart|chain/] [/for|to|of/]?) (?$StockName[{tag:/NN.*|FW|VBP/}]{1,4});
([/cfra|lipper|morningstar/]? [/rating|ratings/] [/for|to|of/]?)
(?$StockName[{tag:/NN.*|FW/}]{1,4});
([/day|day's/] [/'s/]? [/high|low|change/] [/for|to|of/]?)
(?$StockName[{tag:/NN.*|FW/}]{1,4});
([/market/]? [/cap/] [/for|to|of/]?) (?$StockName[{tag:/NN.*|FW/}]{1,4});
([/price/] [/objective/] [/for|to|of/]?) (?$StockName[{tag:/NN.*|FW/}]{1,4});
([/news/] [/wire/]? [/for|to|of/]?) (?$StockName[{tag:/NN.*|FW/}]{1,4});
([/expense|price|p\/e/] [/ratio/]? [/for|to|of/]?) (?$StockName[{tag:/NN.*|FW/}]{1,4});
([/earnings/] [/per/]? [/share/]? [/for|to|of/]?) (?$StockName[{tag:/NN.*|FW/}]{1,4});
([/fund/] [/inception/] [/date/] [/for|to|of/]?) (?$StockName[{tag:/NN.*|FW/}]{1,4});
([/carbon/] [/footprint/] [/for|to|of/]?) (?$StockName[{tag:/NN.*|FW/}]{1,4});
([/net/] [/asset/] [/value/] [/for|to|of/]?) (?$StockName[{tag:/NN.*|FW/}]{1,4});
(?$StockName[{tag:/NN.*|FW/}]{1,4}) ([/quote|chart|trends|doing/]);
(?$StockName[{tag:/NN.*|FW/}]{1,4}) ([/stock|fund/] [/story/]?);
([/stock|fund|quote|chart|trends|impact/] [/for|to|of/]?)
(?$StockName[{tag:/NN.*|FW/}]{1,4}); and
([/sell|buy|add|remove|short/] [/for|to|of/]?) (?$StockName[{tag:/NN.*|FW/}]{1,4}).
```

NN may refer to a word that is associated with being a noun. FW may refer to a foreign word. A foreign word may be a word that is recognized as a word from a foreign language, or, in certain embodiments, a word that is not recognized by the system. VBP may refer to a singular verb in present tense.

A method for routing a verbal request with increased processing speed, accuracy, and efficiency is provided. The method may be executed via a set of computer-executable instructions stored in a non-transitory memory and run on a processor. The method may include: storing a plurality of modules in a database, each module comprising a set of information; configuring said plurality of modules in a multi-tier tree architecture, said multi-tier tree architecture comprising at least three tiers, wherein: the first tier comprises a first module that is a root node; each tier aside from the first tier comprises one or more modules that are each a child of a parent module that is one tier up in the tree, wherein up in the tree is closer to the first tier; and the set of information of a child module is a subset of the set of information of the parent module of said child module.

The method may also include receiving an utterance. The utterance may include a string of one or more words spoken by a system user. The string of words may include a user request. The method may also include processing the utterance via a natural language processing (NLP) engine. The method may also include routing the utterance. The routing may include: identifying a highest tier module that matches a predetermined portion of the utterance; when at least one descendent module of said highest tier module exists, compiling one or more of the descendent modules into a result set of modules; when descendent modules of said highest tier module do not exist, compiling said highest tier module into the result set of modules; and transmitting the result set of modules to the system user, the result set of modules comprising a comprehensive and narrowly tailored response to the user request.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to language processing. The input/output module may also include one or more speakers for providing audio output and a video display device for providing textual, audio, audiovisual, and/or graphical output. The input and output may be related to computer application functionality. The input and output may be related to user requests from a system.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to language processing of user requests.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
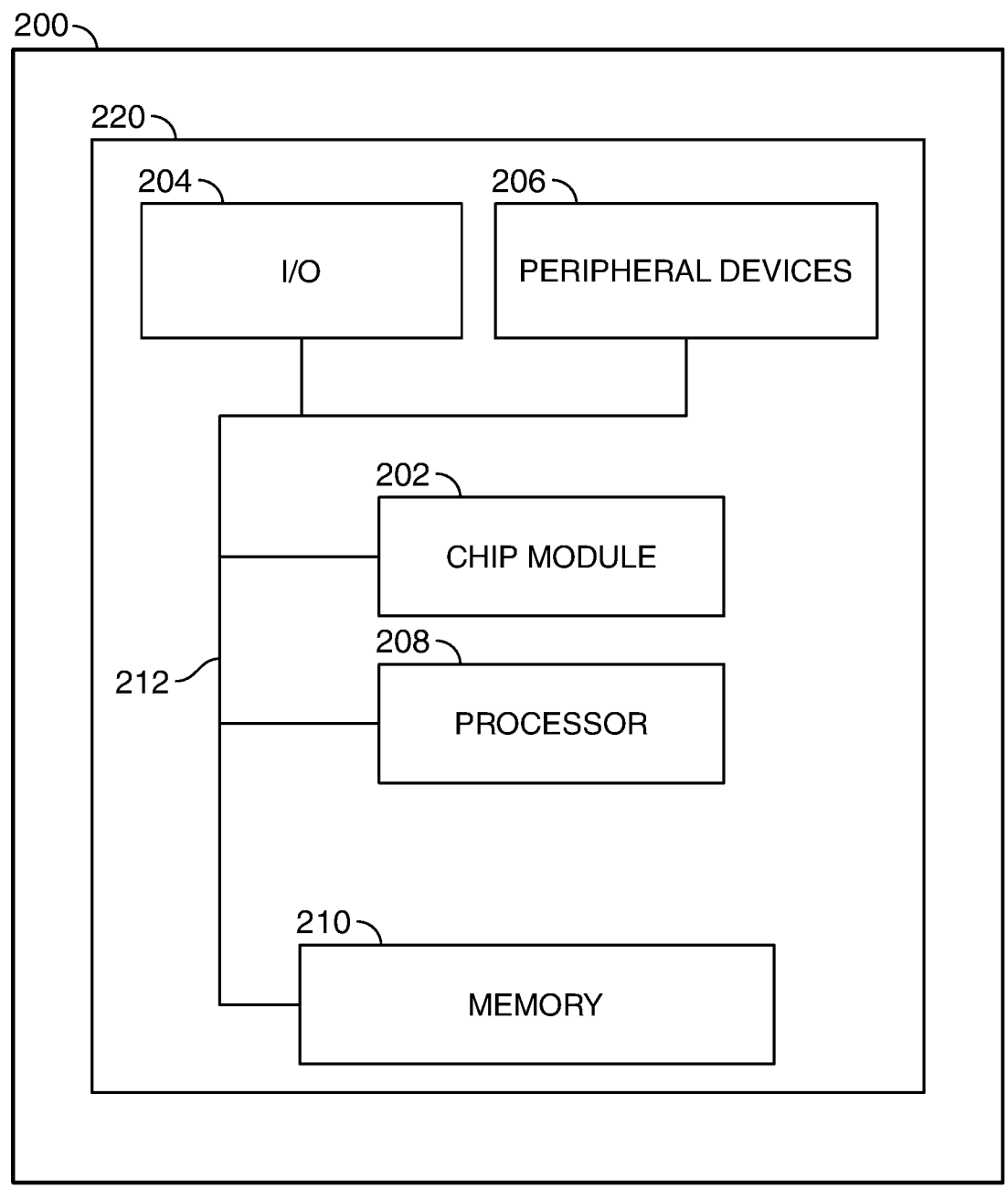
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
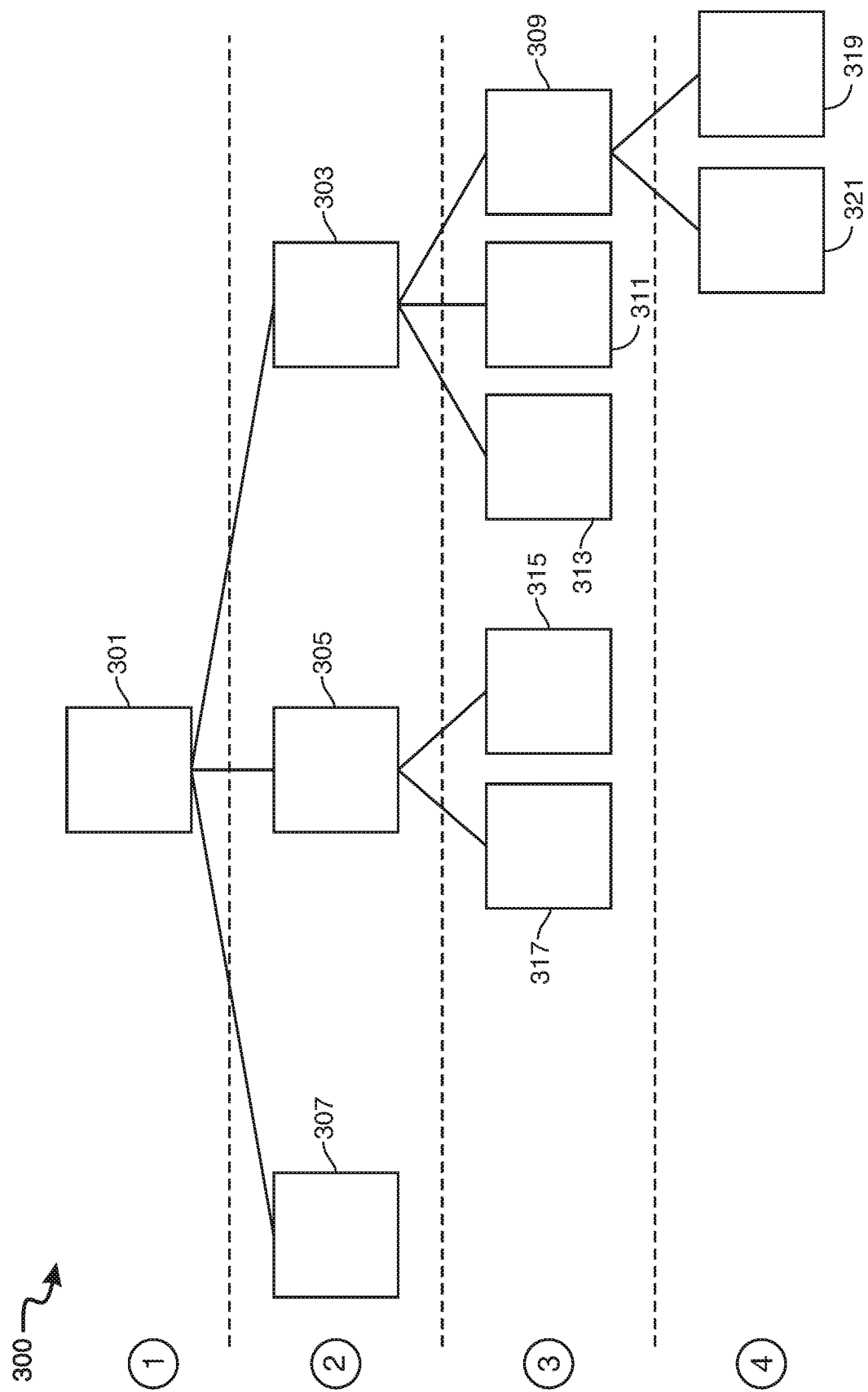
FIG. 3 shows an illustrative system architecture in accordance with principles of the disclosure.

FIG. 3 shows illustrative system architecture 300 in accordance with principles of the disclosure. System architecture 300 may include tiers 1-4. Tier 1 may include module 301, which may be the root node. Tier 2 may include modules 303-307. Tier 3 may include modules 309-317. Tier 4 may include modules 319 and 321. The solid lines connecting the modules show a parent/child relationship. Parents may be in higher tiers than children. For example, modules 319 and 321 may be children of module 309.

Figure 4:
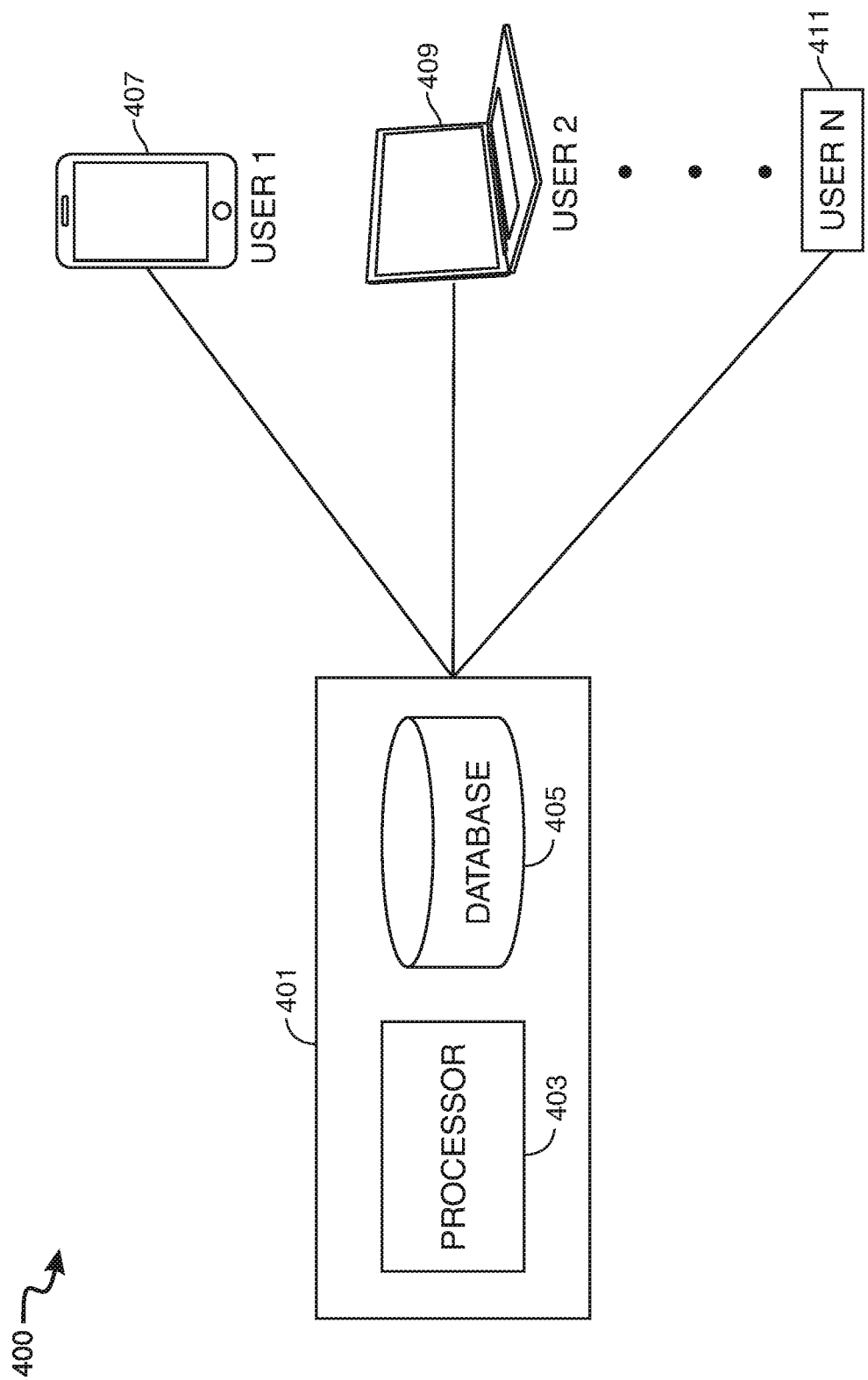
FIG. 4 shows an illustrative system diagram in accordance with principles of the disclosure.

FIG. 4 shows illustrative system diagram 400 in accordance with principles of the disclosure. Diagram 400 includes platform 401. Platform 401 may include processor 403 and database 405. Processor 403 may include, or be linked to, machine learning and/or language processing engines. Database 405 may include regular expression pattern sets that may be associated with various modules. Platform 401 may be linked to user devices 407-411. Illustrative user devices may include telephones and computing devices.

Figure 5:
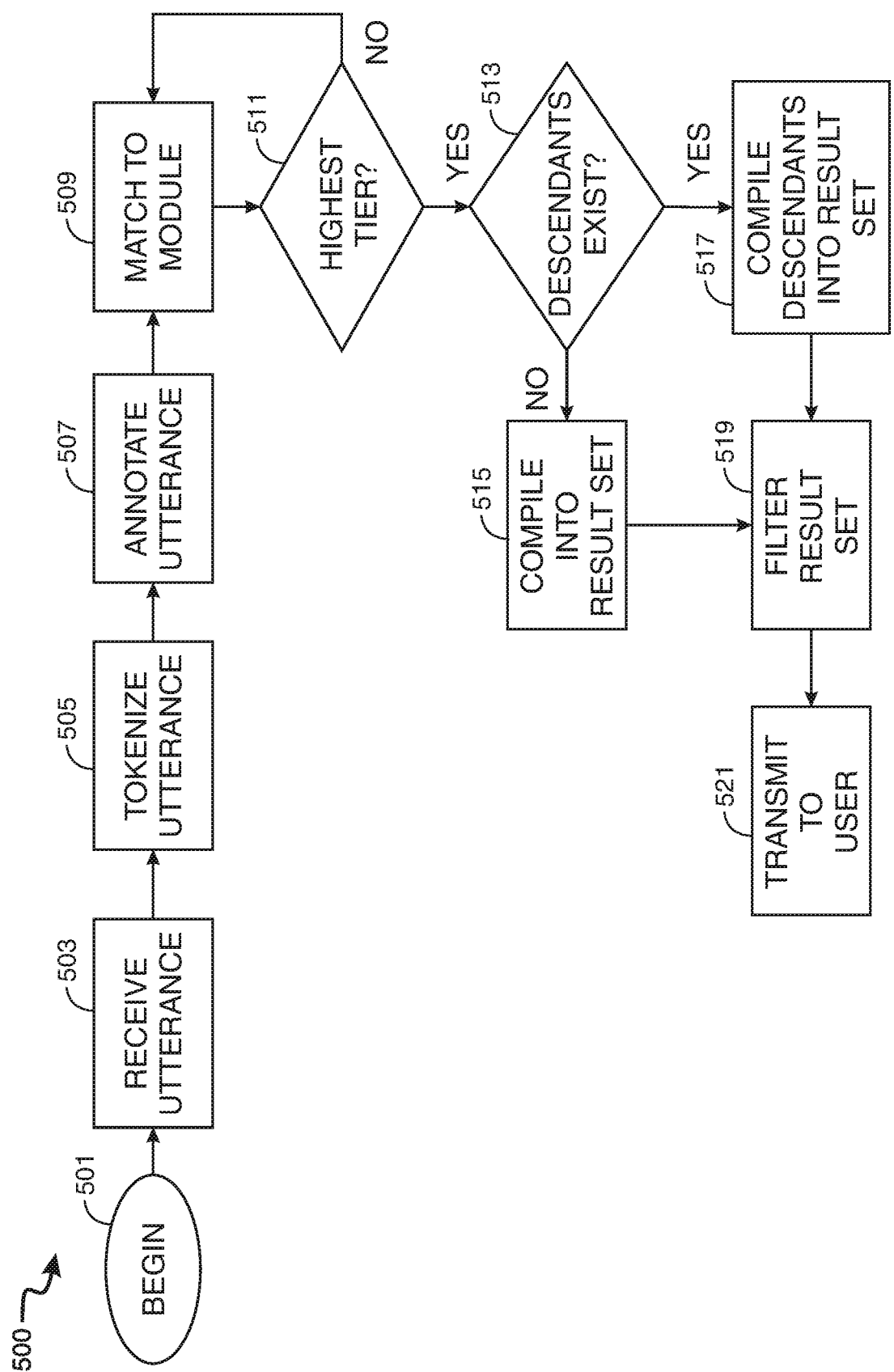
FIG. 5 shows an illustrative flowchart in accordance with principles of the disclosure.

FIG. 5 shows illustrative flowchart 500 in accordance with principles of the disclosure. Flowchart 500 begins with receiving an utterance at 503. The system may tokenize the utterance at 505. The system may annotate the utterance at 507. The system may match the processed utterance at 509. If the match is the highest tier match at 511, the system may check for descendants at 513. If no descendants exist, the system may compile the matching highest tier into a result set at 515. If descendants do exist, the system may compile the descendants into a result set at 517. The system may filter the result set at 519, and transmit the set to the user at 521.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a hierarchical multi-tier language processing platform are provided. Persons skilled in the art will appreciate that the present invention can be practiced by other than the described embodiments, which are presented for purposes of illustration rather than of limitation, and that the present invention is limited only by the claims that follow.

What is claimed is:

1. A hierarchical multi-tier digital platform with increased processing speed, accuracy, and efficiency for routing a verbal request, said platform comprising:

a processor; a database comprising a plurality of modules, each module comprising a set of information, wherein said plurality of modules is configured in a multi-tier tree architecture, said multi-tier tree architecture comprising at least three tiers, wherein: the first tier comprises a first module that is a root node;

each tier aside from the first tier comprises one or more modules that are each a child of a parent module that is one tier up in the tree, wherein up in the tree is closer to the first tier; and the set of information of a child module is a subset of the set of information of the parent module of said child module; and a non-transitory memory storing a set of computer-executable instructions, that, when run on the processor, are configured to: receive an utterance, said utterance comprising a string of one or more words spoken by a system user, said string of words comprising a user request; process the utterance via a natural language processing (NLP) engine; and route the utterance, said routing comprising: identifying a highest tier module that matches a predetermined portion of the utterance; when at least one descendent module of said highest tier module exists, compiling one or more of the descendent modules into a result set of modules; when descendent modules of said highest tier module do not exist, compiling said highest tier module into the result set of modules; and transmitting the result set of modules to the system user, the result set of modules comprising a comprehensive and narrowly tailored response to the user request;

wherein the database further comprises at least one rule set, said rule set comprising a set of regular expression patterns, and the platform is further configured to resolve an intent of the utterance by comparing the utterance to the rule set to find a match between the utterance and one of the regular expression patterns; and wherein the set of regular expression patterns of one of the rule sets comprises:

([/range|quote|close|open/] [/for|of/]?) (?$StockName[{tag:/NN.*|FW/}]{1,4});
([/reports|price/] [/range/]? [/for|of/]?) (?$StockName[{tag:/NN.*|FW/}]{1,4});
([/sector/] [/for|to/]?) (?$StockName[{tag:/NN.*|FW/}]{1,4});
([/52-week/] [/range/] [/for|of/]?) (?$StockName[{tag:/NN.*|FW/}]{1,4});
([/analysts/]) (?$StockName[{tag:/NN.*|FW|VBP/}]{1,4});
([/nav/]) (?$StockName[{tag:/NN.*|FW|VBP/}]{1,4});
([/peers|volume|esg|analysts|articles|beta|coverage|dividend|earnings|eps|nav|news|fundamentals|chart|chain/] [/for|to|of/]?) (?$StockName[{tag:/NN.*|FW|VBP/}]{1,4});
([/cfra|lipper|morningstar/]? [/rating|ratings/] [/for|to|of/]?)
(?$StockName[{tag:/NN.*|FW/}]{1,4});
([/day|day's/] [/'s/]? [/high|low|change/] [/for|to|of/]?)
(?$StockName[{tag:/NN.*|FW/}]{1,4});
([/market/]? [/cap/] [/for|to|of/]?) (?$StockName[{tag:/NN.*|FW/}]{1,4});
([/price/] [/objective/] [/for|to|of/]?) (?$StockName[{tag:/NN.*|FW/}]{1,43});
([/news/] [/wire/]? [/for|to|of/]?) (?$StockName[{tag:/NN.*|FW/}]{1,4});
([/expense|price|p\/e/] [/ratio/]? [/for|to|of/]?) (?$StockName[{tag:/NN.*|FW/}]{1,4});
([/earnings/] [/per/]? [/share/]? [/for|to|of/]?) (?$StockName[{tag:/NN.*|FW/}]{1,43});
([/fund/] [/inception/] [/date/] [/for|to|of/]?) (?$StockName[{tag:/NN.*|FW/}]{1,4});
([/carbon/] [/footprint/] [/for|to|of/]?) (?$StockName[{tag:/NN.*|FW/}]{1,4});
([/net/] [/asset/] [/value/] [/for|to|of/]?) (?$StockName[{tag:/NN.*|FW/}]{1,4});
(?$StockName[{tag:/NN.*|FW/}]{1,4}) ([/quote|chart|trends|doing/]);

```
(?$StockName[{tag:/NN.*|FW/}]{1,4}) ([/stock|fund/] [/story/]?);
([/stock|fund|quote|chart|trends|impact/] [/for|to|of/]?)
(?$StockName[{tag:/NN.*|FW/}]{1,4}); and
([/sell|buy|add|remove|short/] [/for|to|of/]?) (?$StockName[{tag:/NN.*|FW/}]{1,4});
``` wherein NM refers to a word that is associated with being a noun; and

FW refers to a foreign word, said foreign word being a word that is not recognized as a word that is part of a predetermined native language.

2. The platform of claim 1, wherein the result set of modules comprises only the descendent modules that are a maximum of one tier below said highest tier module.

3. The platform of claim 2, wherein, when the result set of modules comprises at least one module that is a parent module to at least two child modules, the platform is further configured to transmit to the system user a request to select one or more modules from the at least two child modules, and, based on the selection, remove from the result set any unselected modules of the at least two child modules.

4. The platform of claim 1, wherein the result set of modules comprises only modules that are leaf nodes, said leaf nodes being modules that are not parent modules of any child modules.

5. The platform of claim 1, wherein the system user is subscribed to one or more of the plurality of modules, and the result set of modules is filtered to include only subscribed modules, said subscribed modules comprising modules to which the system user is subscribed or to which the system user is subscribed to at least one descendent.

6. The platform of claim 1, wherein each module comprises an investment account or a category of investment accounts, and the set of information of a module comprises investment account information.

7. The platform of claim 1, wherein the database comprises a distinct rule set for each module.

8. The platform of claim 1, wherein one of the rule sets comprises a rule for identifying stock names, and said rule for identifying stock names comprises identifying a word from the utterance that is a noun as a stock name, wherein a word that is a noun includes a word that is a part of speech other than a noun but is used in a portion of the utterance that is associated with being a noun.

9. The platform of claim 1, wherein processing the utterance comprises:
tokenizing the utterance via the NLP engine; and
annotating the utterance via the NLP engine.

10. A method for routing a verbal request with increased processing speed, accuracy, and efficiency, said method executed via a set of computer-executable instructions stored in a non-transitory memory and run on a processor, said method comprising: storing a plurality of modules in a database, each module comprising a set of information; configuring said plurality of modules in a multi-tier tree architecture, said multi-tier tree architecture comprising at least three tiers, wherein: the first tier comprises a first module that is a root node; each tier aside from the first tier comprises one or more modules that are each a child of a parent module that is one tier up in the tree, wherein up in the tree is closer to the first tier; and the set of information of a child module is a subset of the set of information of the parent module of said child module; receiving an utterance, said utterance comprising a string of one or more words spoken by a system user, said string of words comprising a user request; processing the utterance via a natural language processing (NLP) engine; and routing the utterance, said routing comprising: identifying a highest tier module that matches a predetermined portion of the utterance; when at least one descendent module of said highest tier module exists, compiling one or more of the descendent modules into a result set of modules; when descendent modules of said highest tier module do not exist, compiling said highest tier module into the result set of modules; and transmitting the result set of modules to the system user, the result set of modules comprising a comprehensive and narrowly tailored response to the user request;

wherein the database further comprises at least one rule set, said rule set comprising a set of regular expression patterns, and the method further comprises resolving an intent of the utterance by comparing the utterance to the rule set to find a match between the utterance and one of the regular expression patterns; and one of the rule sets comprises a rule for identifying stock names, and said rule for identifying stock names comprises identifying a word from the utterance that is a noun as a stock name, wherein a word that is a noun includes a word that is a part of speech other than a noun but is used in a portion of the utterance that is associated with being a noun; and wherein the database comprises a distinct rule set for each module; and the set of regular expression patterns of one of the rule sets comprises:

```
([/range|quote|close|open/] [/for|of/]?) (?$StockName[{tag:/NN.*|FW/}]{1,4});
([/reports|price/] [/range/]? [/for|of/]?) (?$StockName[{tag:/NN.*|FW/}]{1,4});
([/sector/] [/for|to/]?) (?$StockName[{tag:/NN.*|FW/}]{1,4});
([/52-week/] [/range/] [/for|of/]?) (?$StockName[{tag:/NN.*|FW/}]{1,4});
([/analysts/]) (?$StockName[{tag:/NN.*|FW|VBP/}]{1,4});
([/nav/]) (?$StockName[{tag:/NN.*|FW|VBP/}]{1,4});
([/peers|volume|esg|analysts|articles|beta|coverage|dividend|earnings|eps|nav|news|fundamen
tals|chart|chain/] [/for|to|of/]?) (?$StockName[{tag:/NN.*|FW|VBP/}]{1,4});
([/cfra|lipper|morningstar/]? [/rating|ratings/] [/for|to|of/]?)
(?$StockName[{tag:/NN.*|FW/}]{1,4});
([/day|day's/] [/'s/]? [/high|low|change/] [/for|to|of/]?)
(?$StockName[{tag:/NN.*|FW/}]{1,4});
([/market/]? [/cap/] [/for|to|of/]?) (?$StockName[{tag:/NN.*|FW/}]{1,4});
([/price/] [/objective/] [/for|to|of/]?) (?$StockName[{tag:/NN.*|FW/}]{1,43});
([/news/] [/wire/]? [/for|to|of/]?) (?$StockName[{tag:/NN.*|FW/}]{1,4});
```

-continued ([/expense|price|p\/e/] [/ratio/]? [/for|to|of/]?) (?$StockName[{tag:/NN.*|FW/}]{1,4});
([/earnings/] [/per/]? [/share/]? [/for|to|of/]?) (?$StockName[{tag:/NN.*|FW/}]{1,43});
([/fund/] [/inception/] [/date/] [/for|to|of/]?) (?$StockName[{tag:/NN.*|FW/}]{1,4});
([/carbon/] [/footprint/] [/for|to|of/]?) (?$StockName[{tag:/NN.*|FW/}]{1,4});
([/net/] [/asset/] [/value/] [/for|to|of/]?) (?$StockName[{tag:/NN.*|FW/}]{1,4});
(?$StockName[{tag:/NN.*|FW/}]{1,4}) ([/quote|chart|trends|doing/]);
(?$StockName[{tag:/NN.*|FW/}]{1,4}) ([/stock|fund/] [/story/]?);
([/stock|fund|quote|chart|trends|impact/] [/for|to|of/]?)
(?$StockName[{tag:/NN.*|FW/}]{1,4}); and
([/sell|buy|add|remove|short/] [/for|to|of/]?) (?$StockName[{tag:/NN.*|FW/}]{1,4});

wherein NN refers to a word that is associated with being a noun; and

FW refers to a foreign word, said foreign word being a word that is not recognized as a word that is part of a predetermined native language.

11. The method of claim 10, wherein:
the result set of modules comprises only the descendent modules that are a maximum of one tier below said highest tier module; and
when the result set of modules comprises at least one module that is a parent module to at least two child modules, the method further comprises transmitting to the system user a request to select one or more modules from the at least two child modules, and, based on the selection, removing from the result set any unselected modules of the at least two child modules.

12. The method of claim 10, wherein the result set of modules comprises only modules that are leaf nodes, said leaf nodes being modules that are not parent modules of any child modules.

13. The method of claim 10, wherein the system user is subscribed to one or more of the plurality of modules, and the result set of modules is filtered to include only subscribed modules, said subscribed modules comprising modules to which the system user is subscribed or to which the system user is subscribed to at least one descendent.

14. The method of claim 10, wherein each module comprises an investment account or a category of investment accounts, and the set of information of a module comprises investment account information.

15. The method of claim 10, wherein processing the utterance comprises:
tokenizing the utterance via the NLP engine; and
annotating the utterance via the NLP engine.

16. A language processing system with increased processing speed, accuracy, and efficiency, said system comprising:
a processor;
a database comprising a plurality of modules, each module comprising a set of information, wherein said plurality of modules is configured in a multi-tier tree architecture, said multi-tier tree architecture comprising at least three tiers,
wherein: the first tier comprises a first module that is a root node;
each tier aside from the first tier comprises one or more modules that are each a child of a parent module that is one tier up in the tree, wherein up in the tree is closer to the first tier; and
the set of information of a child module is a subset of the set of information of the parent module of said child module; and
a non-transitory memory storing a set of computer-executable instructions, that, when run on the processor, are configured to:
receive an utterance, said utterance comprising a string of one or more words spoken by a system user, said string of words comprising a user request; process the utterance via a natural language processing (NLP) engine; and route the utterance, said routing comprising:
identifying a highest tier module that matches a predetermined portion of the utterance;
when at least one descendent module of said highest tier module exists, compiling one or more of the descendent modules into a result set of modules;
when descendent modules of said highest tier module do not exist, compiling said highest tier module into the result set of modules; and
transmitting the result set of modules to the system user, the result set of modules comprising a comprehensive and narrowly tailored response to the user request;
wherein: the result set of modules comprises only modules that are leaf nodes, said leaf nodes being modules that are not parent modules of any child modules; and
the system user is subscribed to one or more of the plurality of modules, and the result set of modules is filtered to include only subscribed modules, said subscribed modules comprising modules to which the system user is subscribed or to which the system user is subscribed to at least one descendent;
wherein the database further comprises at least one rule set, said rule set comprising a set of regular expression patterns, and the system is further configured to resolve an intent of the utterance by comparing the utterance to the rule set to find a match between the utterance and one of the regular expression patterns; and one of the rule sets comprises a rule for identifying stock names, and said rule for identifying stock names comprises identifying a word from the utterance that is a noun as a stock name, wherein a word that is a noun includes a word that is a part of speech other than a noun but is used in a portion of the utterance that is associated with being a noun; and
wherein the database comprises a distinct rule set for each module; and the set of regular expression patterns of one of the rule sets comprises:

([/range|quote|close|open/] [/for|of/]?) (?$StockName[ {tag:/NN.*|FW/}]{1,4});
([/reports|price/] [/range/]? [/for|of/]?) (?$StockName[ {tag:/NN.*|FW/}]{1,4});
([/sector/] [/for|to/]?) (?$StockName[ {tag:/NN.*|FW/}]{1,4});
({/52-week/] [/range/] [/for|of/]?) (?$StockName[ {tag:/NN.*|FW/}]{1,4});

-continued

```
([/analysts/) (?$StockName[ {tag:/NN.*|FW/}]{1,4});
([/nav/])(?$StockName[ {tag:/NN.*|FW/}]{1,4});
([/peers|volume|esg|analysts|articles|beta|coverage|dividend|earnings|eps|nav|news|
fundamen tals|
chart|chain/] [/for|to|of/]?) (?$StockName[ {tag:/NN.*|FW/}]{1,4});
([/cfra|lipper|morningstar/]?[/rating|ratings/]/for|to|of/]?) (?$StockName
[{tag:/NN.*|FW/}]{1,4});
):
([/day|day's/][/'s]?[/high|low|change/][/for|to|of/]?) (?$StockName[ {tag:/NN.*|FW/}]
{1,4});
([/market/]?[/cap/] [/for|to|of/]?) (?$StockName| {tag:/NN.*|FW/}]{1,4});
([/price/][/objective] [/for|to|of/]?) (?$StockName[{tag:/NN.*|FW/}]{1,4});
([/news/] [/wire/]? [/for|to|of/]?) (?$StockName[ {tag:/NN.*|FW/}]{1,4});
([/expense|price|pVe/] [/ratio/]? [/for|to|of/]?) (?$StockName|[{tag:/NN.*|FW/}]{1,
4});
({/earnings/] [/per/]? [/share/]? [/for|to|of/]?) (?$StockName[ {tag:/NN.*|FW/}]{1,
4});
({/fund/] [/inception/] [/date/] [/for|to|of/]?) (°$StockName[ {tag:/NN.*|FW/}]{1,
4});
({/carbon/] [/footprint/] [/for|to|of/]?) (?$StockName|[{tag:/NN.*|FW/}]{1,4});
([/net/] [/asset/] [/value/] [/for|to|of/]?) (?$StockName[ {tag:/NN.*|FW/}]{1,4});
(?$StockName| {tag:/NN.*|FW/}]{1,4}) ([/quote|chat|trends|doing/]);
(?$StockName| {tag:/NN.*|FW/}]{1,4}) ([/stock|fund/] [/story/]?);
({/stock|fund|quote|chart|trends|impact/] [/for|to|of/]?) (?$StockName|[
{tag:/NN.*|FW/}]{1,4});
and ([{/sell|buy|add|remove|short/] [/for|to|of/]?) (?$StockName|[{tag:/NN.*|FW/}]
{1,4});
``` wherein NN refers to a word that is associated with being a noun; and

FW refers to a foreign word, said foreign word being a word that is not recognized as a word that is part of a predetermined native language.

\* \* \* \* \*